United States Patent
Wu et al.

(10) Patent No.: US 12,033,315 B1
(45) Date of Patent: Jul. 9, 2024

(54) MACHINE VISION-BASED TECHNIQUES FOR NON-CONTACT STRUCTURAL HEALTH MONITORING

(71) Applicant: Bentley Systems, Incorporated, Exton, PA (US)

(72) Inventors: Zheng Yi Wu, Watertown, CT (US); Dian Mo, Watertown, CT (US); Peng Xiao, Watertown, CT (US)

(73) Assignee: Bentley Systems, Incorporated, Exton, PA (US)

( * ) Notice: Subject to any disclaimer, the term of this patent is extended or adjusted under 35 U.S.C. 154(b) by 265 days.

(21) Appl. No.: 17/196,467

(22) Filed: Mar. 9, 2021

(51) Int. Cl.
| | | |
|---|---|---|
| G06K 9/00 | (2022.01) | |
| G06F 18/22 | (2023.01) | |
| G06T 7/00 | (2017.01) | |
| G06V 10/25 | (2022.01) | |
| G06V 10/75 | (2022.01) | |
| G06V 20/40 | (2022.01) | |

(52) U.S. Cl.
CPC .............. *G06T 7/001* (2013.01); *G06F 18/22* (2023.01); *G06V 10/25* (2022.01); *G06V 10/751* (2022.01); *G06V 20/48* (2022.01); *G06T 2200/24* (2013.01); *G06T 2207/10016* (2013.01); *G06T 2207/20021* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 10,108,325 B2 * | 10/2018 | Hay | G06T 7/248 |
| 10,451,416 B1 | 10/2019 | Wu et al. | |
| 10,801,998 B2 * | 10/2020 | Giurgiutiu | G01N 29/2437 |
| 11,281,935 B2 * | 3/2022 | Vu | G06V 20/10 |
| 11,362,867 B2 * | 6/2022 | Jin | H04L 25/4902 |
| 11,363,460 B1 * | 6/2022 | Van Vliet | H04W 12/63 |
| 11,526,165 B1 * | 12/2022 | Benavidez | G05D 1/0044 |
| 2011/0075937 A1 * | 3/2011 | Tate | G06T 7/001 |
| | | | 382/218 |

(Continued)

OTHER PUBLICATIONS

Dong et al. , "A review of computer vision-based structural health monitoring at local and global levels", Structural Health Monitoring , Mar. 2021 (Year: 2021).*

(Continued)

*Primary Examiner* — Randolph I Chu
(74) *Attorney, Agent, or Firm* — Cesari and McKenna, LLP; James A. Blanchette

(57) ABSTRACT

In various example embodiments, machine vision-based techniques for non- contact SHM are provided that may integrate both phase-based algorithms and template matching algorithms to enable selection of one or more machine vision algorithms that are effective at measuring responses (e.g., displacement, strain, acceleration, velocity, etc.) under present conditions. Results of a single algorithm or a combination of results from multiple algorithms may be returned. In such techniques, improved template matching algorithms may be employed that provide sub-pixel accuracy. Responses may be adjusted to cancel out camera vibration and video noise. Defects or damage may be determined by tracking changes in displacement within an area of interest.

16 Claims, 8 Drawing Sheets

(56) References Cited

U.S. PATENT DOCUMENTS

| | | | |
|---|---|---|---|
| 2011/0220796 A1* | 9/2011 | Nicolopoulos | H01J 37/28 250/311 |
| 2015/0330950 A1* | 11/2015 | Bechhoefer | G01N 29/46 73/587 |
| 2016/0300341 A1* | 10/2016 | Hay | G06F 16/7335 |
| 2018/0084195 A1* | 3/2018 | Yang | H04N 21/234381 |
| 2019/0033263 A1* | 1/2019 | Giurgiutiu | G01N 29/14 |
| 2020/0284686 A1* | 9/2020 | Li | G01M 5/0091 |
| 2021/0271913 A1* | 9/2021 | Nogami | G06F 18/217 |

OTHER PUBLICATIONS

Dong et al "A review of computer cision-based structural health monitoring at local and global levels" Structural Health Monitoring 2021, vol. 20(2) 692-743 (Year: 2021).*

Xiao et al. "Development of video analytics with template matching methods for using camera as sensor and application to highway bridge structural health monitoring", Journal of Civil Structural Health Monitoring (2020) 10:405-424 (Year: 2020).*

German, Stephanie, et al., "Machine Vision-Enhanced Postearthquake Inspection," ASCE, American Society of Civil Engineers, Journal of Computing in Civil Engineering, vol. 27, Issue 6, Nov./Dec. 2013, pp. 622-634.

Jahanshahi, Mohammad R., et al., "A New Methodology for Non-Contact Accurate Crack Width Measurement Through Photogrammetry for Automated Structural Safety Evaluation," IOP Publishing Ltd., IOP Publishing, Smart Materials and Structures, vol. 22, Feb. 15, 2013, pp. 1-12.

Baqersad, Javad, et al., "Photogrammetry and Optical Methods in Structural Dynamics—A Review," Elsevier Ltd., Elsevier, ScienceDirect, Mechanical Systems and Signal Processing, vol. 86, Part B, Feb. 2016, pp. 1-28.

Beauchemin, S.S., et al., "The Computation of Optical Flow," ACM, Inc., ACM Computing Surveys, vol. 27, No. 3, Sep. 1, 1995, pp. 1-44.

Brownjohn, James Mark William, et al., "Vision-Based Bridge Deformation Monitoring," Frontiers in Built Environment, Structural Sensing, Original Research, vol. 3, Article 23, Apr. 19, 2017, pp. 1-16.

Busca, G., et al., "Vibration Monitoring of Multiple Bridge Points by Means of a Unique Vision-Based Measuring System," Experimental Mechanics, vol. 54, Sep. 19, 2013, pp. 1-17.

Chen, Justin G., et al., "Camera-Based Vibration Measurement of the World War I Memorial Bridge in Portsmouth, New Hampshire," American Society of Engineers, ASCE, Journal of Structural Engineering, Aug. 31, 2018, pp. 1-19.

Chen, Justin G., et al., "Modal Identification of Simple Structures With High-Speed Video Using Motion Magnification," Elsevier Ltd., Elsevier, ScienceDirect, Journal of Sound and Vibration, vol. 345, Mar. 2, 2015, pp. 58-71.

Chen, Justin G., et al., "Video Camera-Based Vibration Measurement for Civil Infrastructure Applications," American Society of Engineers, ASCE, Journal of Infrastructure Systems, Dec. 8, 2016, pp. 1-11.

Diamond, D. H., et al., "Accuracy Evaluation of Sub-Pixel Structural Vibration Measurements Through Optical Flow Analysis of a Video Sequence," Elsevier Ltd., Elsevier, ScienceDirect, Measurement, vol. 95, Oct. 11, 2016, pp. 166-172.

Ehrhart, Matthias, et al., "Development and Evaluation of a Long Range Image-Based Monitoring System for Civil Engineering Structures," Society of Photo-Optical Instrumentation Engineers, Proceedings of the SPIE 9437, Structural Health Monitoring and Inspection of Advanced Materials, Aerospace, and Civil Infrastructure 2015, 94370K, Apr. 1, 2015, pp. 1-13.

Feng, Dongming, et al., "Cable Tension Force Estimate Using Novel Noncontact Vision-Based Sensor," Elsevier Ltd., Elsevier, ScienceDirect, Measurement, vol. 99, Dec. 9, 2016, pp. 44-52.

Feng, Dongming, et al., "Computer Vision for SHM of Civil Infrastructure: From Dynamic Response Measurement to Damage Detection—A Review," Elsevier Ltd., Elsevier, ScienceDirect, Engineering Structures, vol. 156, Feb. 1, 2018, pp. 105-117.

Fleet, David J., et al., "Computation of Component Image Velocity from Local Phase Information," Kluwer Academic Publishers, The Netherlands, International Journal of Computer Vision, vol. 5, No. 1, Aug. 1990, pp. 77-104.

Freeman, William T., et al., "The Design and Use of Steerable Filters," IEEE, IEEE Transactions on Pattern Analysis and Machine Intelligence, vol. 13, No. 9, Sep. 1991, pp. 891-906.

Gautama, Temujin, et al., "A Phase-based Approach to the Estimation of the Optical Flow Field Using Spatial Filtering," IEEE, IEEE Transactions on Neural Networks, vol. 13, No. 5, Sep. 24, 2002, pp. 1-28.

Guo, Jie, et al., "Dynamic Displacement Measurement of Large-Scale Structures Based on the Lucas-Kanade Template Tracking Algorithm," Elsevier Ltd., Elsevier, ScienceDirect, Mechanical Systems and Signal Processing, vols. 66-67, Jan. 2016, pp. 425-436.

Jacob, Bernard, Anne-Marie McDonnell, Franziska Schmidt and Wiley Cunagin, editors, "Proceedings of the $6^{th}$ International Conference on Weigh-in-Motion," ICWIM 6, International Society for Weigh-in-Motion (ISWIM) and Institute Français des Sciences et Technologies des Transports, de l'Aménagement et des Réseaux (IFSTTAR), Dallas, Texas, USA, Jun. 4-7, 2012, pp. 1-491.

Jiang, Ruinian, et al., "Close-Range Photogrammetry Applications in Bridge Measurement: Literature Review," Elsevier Ltd., Elsevier, ScienceDirect, Measurement, vol. 41, Jan. 9, 2008, pp. 823-834.

Khuc, Tung, et al., "Completely Contactless Structural Health Monitoring of Real-Life Structures Using Cameras and Computer Vision," John Wiley & Sons, Ltd., Structural Control and Health Monitoring, Wiley Online Library, Feb. 25, 2016, pp. 1-17.

Kolev, Valeri, et al., "Development and Evaluation of a Dual Purpose Bridge Health Monitoring and Weigh-in-Motion System fora Steel Girder Bridge—Phase II," Final Report, Report No. CT-2271-F-15-10, SPR-2271, Department of Civil and Environmental Engineering, School of Engineering, University of Connecticut, Jun. 30, 2016, pp. 1-65.

Lydon, Darragh, et al., "Development and Field Testing of a Vision Based Displacement System Using a Low Cost Wireless Action Camera," Elsevier Ltd., Queen's University Belfast, Mechanical Systems and Signal Processing, vol. 121, Apr. 2019, pp. 1-26.

Magalhaes, Filipe, et al., "Dynamic Monitoring of a Long Span Arch Bridge, Elsevier Ltd., Elsevier, Engineering Structures," vol. 30, May 22, 2008, pp. 3034-3044.

Pan, Bing, et al., "Two-Dimensional Digital Image Correlation for In-Plane Displacement and Strain Measurement: A Review," IOP Publishing, IOPscience, Measurement Science and Technology, vol. 20, Apr. 27, 2009, pp. 1-17.

Peeters, B., et al., "Continuous Monitoring of the Øresund Bridge: System and Data Analysis," Taylor & Francis Group, Structure and Infrastructure Engineering, vol. 5, Issue 5, Jun. 9, 2009, pp. 1-8.

U.S. Appl. No. 16/931,785, filed Jul. 17, 2020 by Zheng Yi Wu et al. for Finite Element Calibration for Structural Load Identification, pp. 1-28.

U.S. Appl. No. 17/027,829, filed Sep. 22, 2020 by Zheng Yi Wu et al. for Crack Detection, Assessment and Visualization Using Deep Learning With 3D Mesh Model, pp. 1-34.

"Video Gauge™—How it Works," Imetrum Ltd., iMETRUM, <https://www.imetrum.com/video-oauge/how-it-works/>, Retrieved on Sep. 9, 2021, pp. 1-2.

Wall, Christopher J., et al., "A Non-Intrusive Bridge Weigh-in-Motion System for a Single Span Steel Girder Bridge Using Only Strain Measurements," Research Report, Report No. CT-2251-3-09-5, SPR-2251, University of Connecticut, Connecticut Transportation Institute, Connecticut Department of Transportation, Aug. 2009, pp. 1-57.

Xu, Yan, "Non-Contact Vision-Based Deformation Monitoring on Bridge Structures," Thesis, University of Exeter, College of Engineering, Mathematics and Physical Sciences, Jun. 2018, pp. 1-188.

Xu, Yan, et al., "Review of Machine-Vision Based Methodologies for Displacement Measurement in Civil Structures," Springer, Springer Link, Journal of Civil Structural Health Monitoring, vol. 8, Dec. 1, 2017, pp. 1-20.

(56) References Cited

OTHER PUBLICATIONS

Ye, X. W., et al., "A Review of Machine Vision-Based Structural Health Monitoring: Methodologies and Applications," Hindawi Publishing Corporation, Hindawi, Journal of Sensors, vol. 2016, Article ID 7103039, Nov. 6, 2016, pp. 1-10.

Yoneyama, Satoru, et al., "Bridge Deflection Measurement Using Digital Image Correlation with Camera Movement Correction," The Japanese Society for Non-Destructive Inspection, Material Transactions, vol. 53, No. 2, Dec. 28, 2011, pp. 285-290.

* cited by examiner

MACHINE VISION-BASED TECHNIQUES FOR NON-CONTACT STRUCTURAL HEALTH MONITORING

BACKGROUND

Technical Field

The present disclosure relates generally to structural health monitoring (SHM) and more specifically to techniques for non-contact SHM.

Background Information

SHM of structures (e.g., buildings, bridges, dams, etc.) is increasingly important as our infrastructure ages since it allows engineers to detect defects and/or damage prior to catastrophic failures. Traditionally, SHM was largely performed manually. Human inspectors would carefully examine the structure, noting and measuring any defects and/or damage. However, such manual SHM is highly labor intensive, incomplete and subjective, and potentially dangerous. It may take significant time for human inspectors to cover every part of a structure. Sometimes, parts of a structure cannot easily or safely be reached. Further, different human inspectors may evaluate similar defects and/or damage differently, based on their own subjective criteria and biases.

More recently, manual SHM by human inspectors has sometimes been supplanted by sensor-based SHM. Typically, a structure is instrumented with a network of sensors that monitor dynamic structural responses. The type of sensors may vary depending on the type of responses of interest. However, most sensors are generally contact sensors such that they are physically placed on the structure. For example, to measure displacement, linear variable different transformers (LVDTs) or global positioning system (GPS) transceivers are often placed on the structure at points of interest.

While an improvement over manual SHM, contact sensor-based SHM has a number of limitations. Installing contact sensors may be labor intensive, costly, and sometimes dangerous. Contact-sensors may need to be installed at locations on the structure that cannot easily or safely be reached. Further, electrical wiring may need to be run to power the sensors at those locations. In addition, contact sensors may require other references to measure certain responses, or may be unable to measure some types of responses. For example, LVDTs may require a known stationary reference point to in order to measure displacement, and GPS transceivers may be unable to measure subtle displacements due to their limited resolution.

There have been some attempts to implement computer-vision based non-contact SHM to address the shortcomings of manual SHM and contact sensor-based SHM. However, such attempts have suffered their own shortcomings, which has prevented them from achieving widespread commercial acceptance. One common shortcoming is that effectiveness varies greatly depending on conditions (e.g., lighting conditions, background conditions, texture condition, alignment conditions, etc.). Existing computer-vision based non-contact SHM typically employs only a single machine vision algorithm to determine responses. However, no single machine vision algorithm is known that is effective at measuring responses under all conditions. Accordingly, while the computer-vision based non-contact SHM may be effective sometimes, it may be lacking other times, when the conditions change.

Accordingly, there is an unmet need for improved machine vision based techniques for non-contact SHM. It would be desirable to address this need, while also ensuring computationally efficiency such that the techniques may be practically implemented using available processing and memory resources.

SUMMARY

In various example embodiments, machine vision-based techniques for non-contact SHM are provided that may integrate both phase-based algorithms and template matching algorithms to enable selection of one or more machine vision algorithms that are effective at measuring responses (e.g., displacement, strain, acceleration, velocity, etc.) under present conditions. Results of a single algorithm or a combination of results from multiple algorithms may be returned. In such techniques, improved template matching algorithms may be employed that provide, for example, sub-pixel accuracy. Responses may be adjusted to cancel out camera vibration and video noise. Defects or damage may be determined by tracking changes in displacement within an area of interest.

In one example embodiment for non-contact SHM, a structural health monitoring software application obtains a video of a structure captured by a video camera. One or more machine vision algorithms are selected from a set of multiple machine vision algorithms provided by the structural health monitoring application, wherein the set of multiple machine vision algorithms includes at least one phase-based algorithm and at least one template matching algorithm. The selected one or more machine vision algorithms are applied to the video of the structure to produce responses. The structural health monitoring software application displays an indicator based on responses in a user interface.

In another example embodiment for non-contact SHM, a structural health monitoring software application obtains a video of a structure captured by a video camera. One or more templates are defined in an initial frame of the video. A search is performed for each template in subsequent frames of the video by sliding the template, comparing the template to the image patch at each possible location, and generating a similarity map based on the comparing. A best-matching image patch for each template is determined using the respective similarity map and responses are calculated based on location of the template in the initial frame and the location of the best-matching image patch. The structural health monitoring software application displays an indicator based on responses in a user interface.

In yet another example embodiment, a structural health monitoring software application obtains a video of a structure captured by a video camera. An area of interest is selected and that area is divided into a grid of cells. One or more machine vision algorithms are applied to the video of the structure to determine a displacement of each cell. Damage is detected based on differences in the displacement of cells. The structural health monitoring software application displays an indicator of the detected defects or damage in a user interface.

It should be understood that a variety of additional features and alternative embodiments may be implemented other than those example embodiments discussed in this Summary. This Summary is intended simply as a brief introduction to the reader for the further description which follows and does not indicate or imply that the example embodiments mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
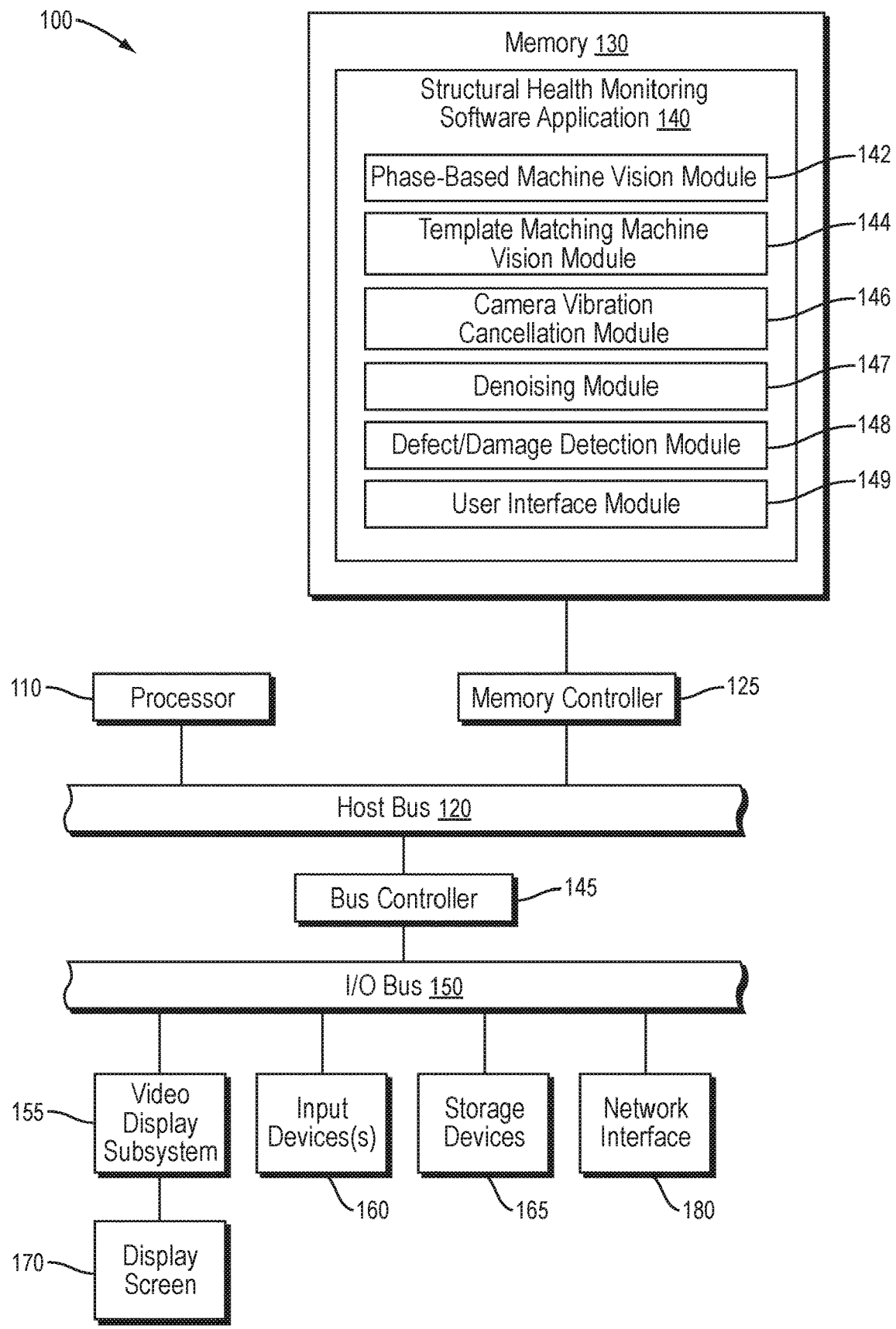
FIG. 1 is a block diagram of an example computing device that may be used with the present techniques.

FIG. 1 is a block diagram of an example computing device 100 that may be used with the present techniques. The computing device 100 includes at least one processor 110 coupled to a host bus 120. The processor 110 may be any of a variety of commercially available processors. A volatile memory 130, such as a Random Access Memory (RAM) is also coupled to the host bus via a memory controller 125. When in operation, the memory 130 stores processor-executable instructions and data that are provided to the processor 110. An input/output (I/O) bus 150 is accessible to the host bust 120 via a bus controller 145. A variety of additional components are coupled to the I/O bus 150. For example, a video display subsystem 155 is coupled to the I/O bus 150. The video display subsystem 155 may include a display screen 170 and hardware to drive the display screen. At least one input device 160, such as a keyboard, a touch sensor, a touchpad, a mouse, etc., is also coupled to the I/O bus 150. A persistent storage device 165, such as a hard disk drive, a solid-state drive, or another type of persistent data store, is further attached, and may persistently store the processor-executable instructions and data, which are loaded into the volatile memory 130 when needed. Still further, a network interface 180 is coupled to the I/O bus 150. The network interface 180 enables communication over a computer network, such as the Internet, between the computing device 100 and other devices, using any of a number of well-known networking protocols. Such communication may enable accessing (e.g., downloading) video of a structure (e.g., building, bridge, dam, etc.) captured by video cameras (e.g., one or more substantially-stationary digital video cameras). Such communication may also enable collaborative, distributed, or remote computing with functionality spread across multiple electronic devices.

Working together the components of the computing device 100 (and other devices in the case of collaborative, distributed, or remote computing) may execute instructions for an a structural health monitoring software application 140 that applies machine vision-based techniques to video of the structure captured by the video cameras to determine responses (e.g., displacement, strain, acceleration, velocity, etc. of points of interest). The structural health monitoring software application 140 may include a number of modules, such as a phase-based machine vision module 142, a template matching machine vision module 144, a camera vibration cancellation module 146, a denoising module 147, a defect/damage detection algorithm 148 and a user interface module 149, among others. As discussed in more detail below, such modules may be integrated to produce an application that is effective at measuring responses under a variety of conditions (e.g., lighting conditions, background conditions, texture condition, alignment conditions, etc.).

Figure 2:
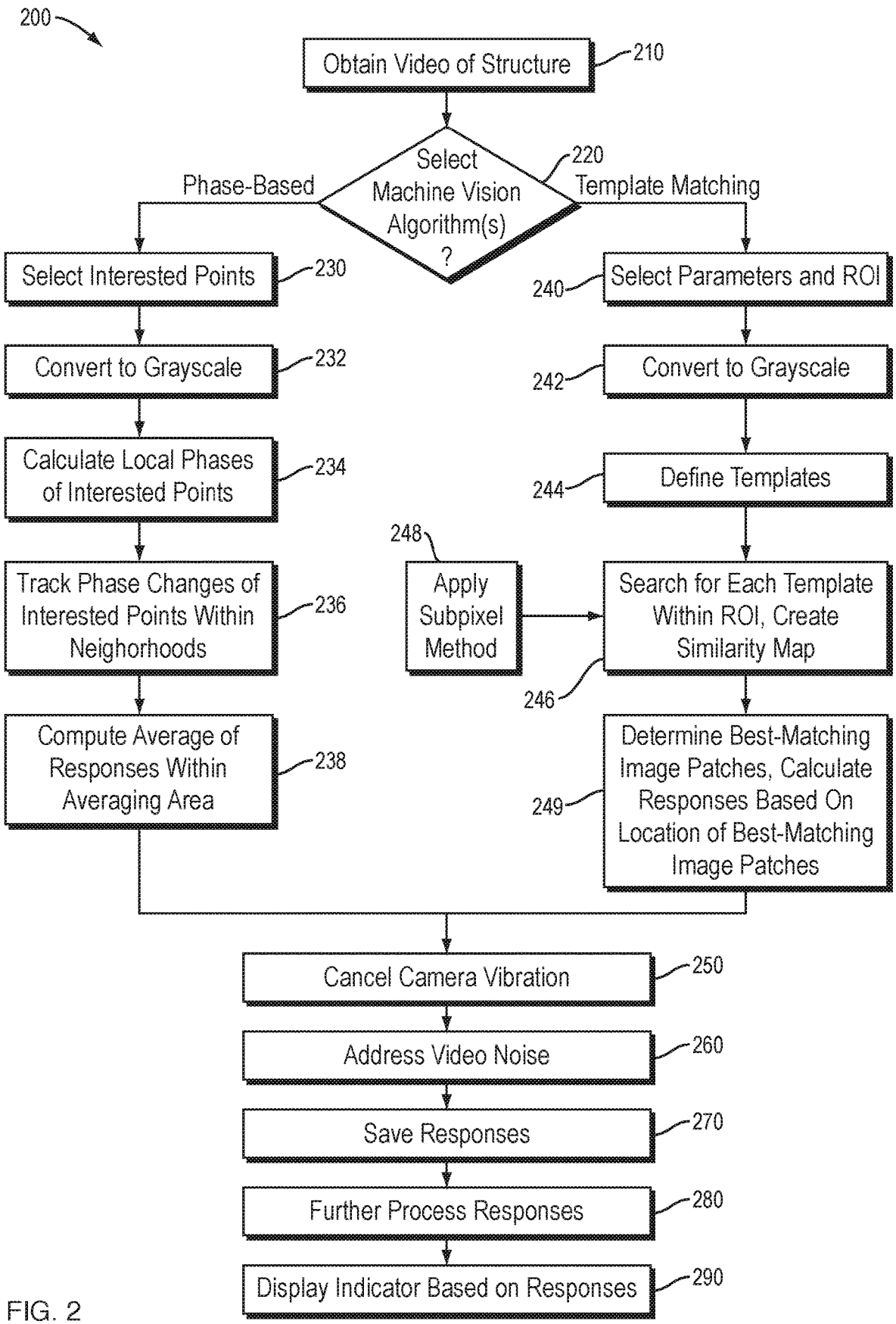
FIG. 2 is a high level flow diagram of an example sequence of steps that may be executed by a structural health monitoring software application.
Figure 3:
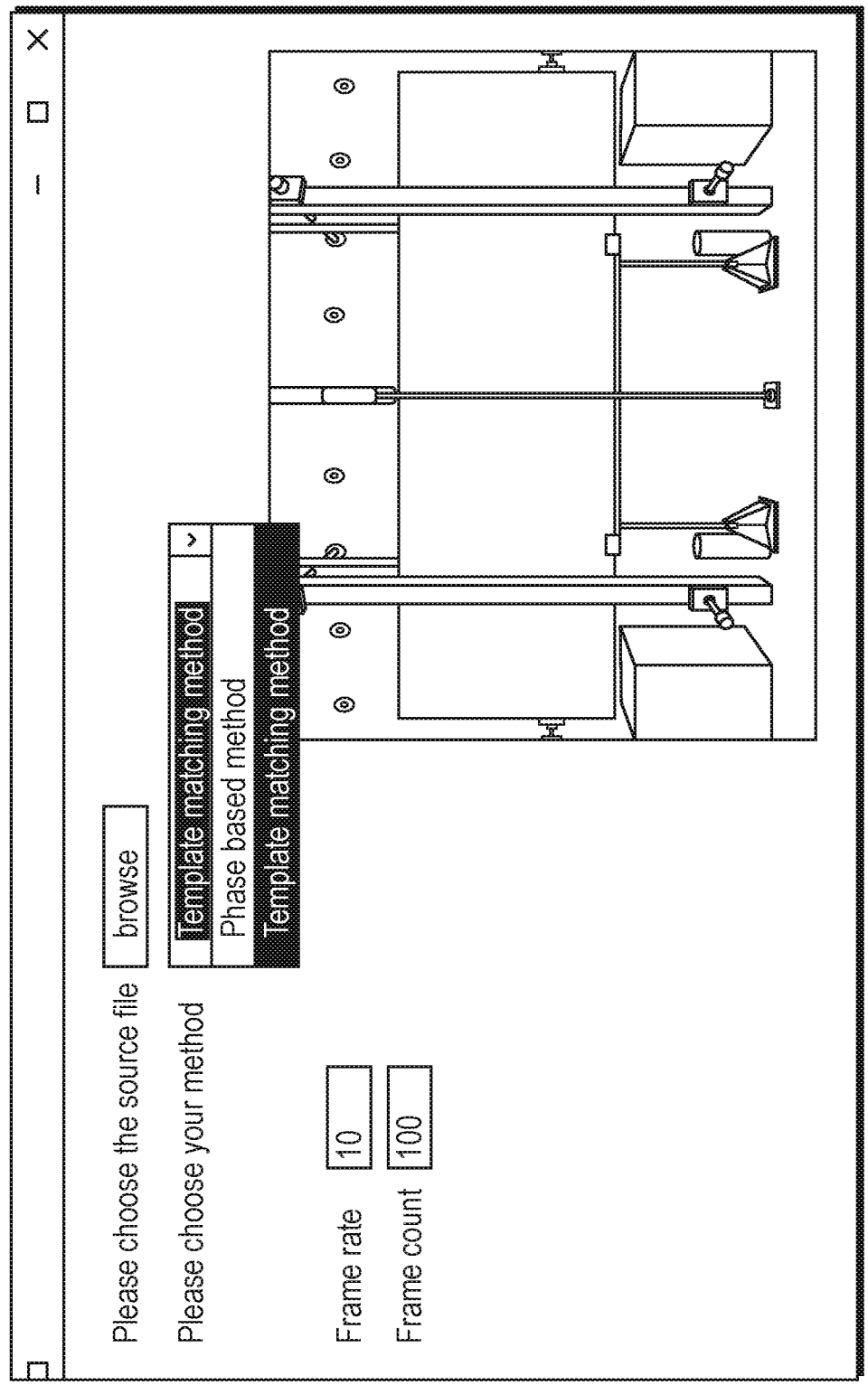
FIG. 3 is a screen shot of an example user interface that may be presented by the structural health monitoring software application to solicit user input.

FIG. 2 is a high level flow diagram of an example sequence of steps 200 that may be executed by the structural health monitoring software application 140. At step 210, the structural health monitoring software application 140 obtains a video of the structure, for example, loads a video that was captured by a video camera in response to user input processed by the user interface module 149. At step 220, the structural health monitoring software application selects one or more machine vision algorithms from among a set of multiple machine vision algorithms, for example, manually based on user input processed by the user interface module 149, or automatically based on characteristics determined by an analysis of the video. FIG. 3 is a screen shot 300 of an example user interface that may be presented by the user interface module 149 of the structural health monitoring software application to solicit user input used in steps 210 and 220 of FIG. 2.

The set of multiple machine vision algorithms may be divided into phase-based algorithms and template matching algorithms. If a phase-based algorithm is selected, execution proceeds to step 230. In general, when using a phase-based algorithm, responses at predetermined points (referred to herein as "interested points") are extracted by tracing change of local phases. When lighting conditions are substantially constant, the intensity of an interested point will be constant within a small neighborhood, even if the point keeps moving. At step 230 the phase-based machine vision module 142 selects interested points in an initial frame of the video, as well as the size of an averaging area (e.g., as a width and height in pixels) for each interested point. The selection may be in response to manual input processed by the user interface module 149, or made automatically. Various criteria may guide selection. For example, points may be selected based on their characteristics indicating high texture contrast with their surroundings.

At step 232, the phase-based machine vision module 142 converts each frame of the video to a gray scale frame. At step 234, the phase-based machine vision module 142 calculates local phases of the interested points of each frame.

At step 236, the phase-based machine vision module 142 tracks phase changes for the interested points within respective neighborhoods. Velocity of the interested points may be initially calculated and other responses (e.g., displacement, acceleration, velocity, etc.) derived from the velocity.

The operations of steps 234 and 236 may be implemented in a variety of different manners. In one implementation, the operations may be based on the following example formulas.

In one dimension, the intensity of an interested point forms a contour of constant intensity c with respect to time, given as:

$$I(x,t)=c,$$

where, x represents the position of the interested point and $I(x,t)=c$, denotes the intensity of the interested point at time t. The derivative of intensity with respect to time is given as:

$$\frac{\partial I}{\partial x}\frac{\partial x}{\partial t} + \frac{\partial I}{\partial t} = 0.$$

Therefore, the velocity of the point movement in the x direction can be obtained as:

$$\frac{\partial x}{\partial t} = -\left(\frac{\partial I}{\partial x}\right)^{-1}\frac{\partial I}{\partial x}.$$

Spatial motion corresponds to the phase change in the frequency domain. Suppose the whole image moves $\Delta x$ from time t to time $(t+\Delta t)$ in the video, then the intensity at time $(t+\Delta t)$ becomes:

$$I(x, t+\Delta t)=I(x-\Delta x, t).$$

Where $\emptyset(t)$ represents the coefficient phase of the Fourier transform of $I(x, t)$ at some frequency, the property of the Fourier transform is given as:

$$\emptyset(t+\Delta t)=\emptyset(t)-\Delta x.$$

The phase change of the Fourier coefficients match the global motion of the whole image. Therefore, to identify the spatial or local motion of an interested point, the change of local phase is considered. Similar to the Fourier transform, the local phase is the coefficient phase of image intensity band-passed with a bank of filters with different orientations.

Local phase may be represented as $\emptyset_\theta(x, y, t)$ at a spatial location $(x, y)$ and time t at an orientation $\theta$, where $\theta$ is the angle between the orientation of the filter and the positive x-axis. The local phase of a fixed point generally forms a constant contour through time. Similar to as with intensity, this phase contour may be given as:

$$\emptyset_\theta(x,y,t)=c,$$

and differentiating with respect to time yields:

$$\frac{\partial \emptyset_\theta}{\partial x}\frac{\partial x}{\partial t} + \frac{\partial \emptyset_\theta}{\partial y}\frac{\partial y}{\partial t} + \frac{\partial \emptyset_\theta}{\partial t} = 0.$$

When $\theta=0$, the filter has orientation along the x-axis and it provides substantially just horizontal phase information (i.e.

$$\frac{\partial \emptyset_\theta}{\partial y} \approx 0$$

). Therefore, the velocity, $u_x$, in units of pixels along the x-axis may be obtained as:

$$u_x = \frac{\partial x}{\partial t} = -\left(\frac{\partial \emptyset_0}{\partial x}\right)^{-1}\frac{\partial \emptyset_0}{\partial t}.$$

Similarly, the velocity, $u_y$, in units of pixels along the y-axis may be obtained as:

$$u_y = \frac{\partial y}{\partial t} = -\left(\frac{\partial \emptyset_{\pi/2}}{\partial y}\right)^{-1}\frac{\partial \emptyset_{\pi/2}}{\partial t},$$

provided that $$\frac{\partial \emptyset_\theta}{\partial x} \approx 0.$$

With velocity of the interested points calculated, other responses may be readily calculated. For example, displacement, $d_x$ and $d_y$, may be obtained as the integral of the velocities given as:

$$d_x = \int_0^\tau u_x dt \text{ and } d_y = \int_0^\tau u_y dt.$$

Similarly, acceleration, $a_x$, and $a_y$, may be obtained as the derivatives of the velocities given as:

$$a_x = \frac{\partial u_x}{\partial t} \text{ and } a_y = \frac{\partial u_y}{\partial t}.$$

Then, at step 238 the phase-based machine vision module 142 computes the average of responses within the averaging area (e.g., as a width and height in pixels) each interested point. This averaged response is then provided as output of the phase-based machine vision module 142 as the response for a monitoring point.

Returning to step 220, if a template-matching algorithm is selected, execution proceeds to step 240. In general, when using a template-matching algorithm, responses are determined by defining one or more templates in an initial frame of the video and determining best-matching image patches for each template in subsequent frames. Changes in the location between the initial frame and the subsequent frames indicate displacement, and other responses can be determined from displacement. An indicator metric may be used to measure how similar a template is to an image patch. The indicator metric may vary based on the specific type of template-matching algorithm employed.

At step 240, the template matching machine vision module 144 selects parameters and a region of interest (ROI) for the template-matching algorithm. The parameters may include a type of template-matching algorithm (e.g., Squared Difference (SQDIFF), Cross Correlation (CCORR), Correlation Coefficient (CCOEFF), Rectangle Histogram of Oriented Gradients (RHOG), Projection and Quantization of the Histogram of Oriented Gradients (PQHOG), etc.), number of templates to use (e.g., a single template, multiple templates, or a grid of templates), template sizes, and templet locations , among other possible parameters. The parameters may be selected, for example, manually based on user input processed by the user interface module 149, or automatically based on characteristics determined by an analysis of the video. The ROI may be an area in which a best-matching image patch for each template may be found in subsequent frames. The ROI may be selected, for example, manually based on user input processed by the user interface module 149, or automatically.

At step 242, the template matching machine vision module 144 converts each frame of the video to a gray scale frame. At step 244, the phase-based machine vision module 142 defines one or more templates in an initial frame of the video (e.g., a single template, multiple templates, or a grid of templates) based on the parameters. Each template is selected as an area (e.g., a rectangular area) that includes identifiable features. The size of the area is defined by the template size and preferably is not be too small such that it does not include enough identifiable features to match with image patches of subsequent frames, nor too large that it includes pixels that may not move substantially in the same way or such that it unduly increases computational cost (in terms of processor and memory resources). In some implementations, to ensure the area has enough identifiable features, artificial markers or signs may be positioned on the structure to function as monitoring targets. However, it should be understood that template-matching may operate without artificial markers or signs being employed.

At step 246, the template matching machine vision module 144 searches for each template within the ROI in subsequent frames by sliding the template within the ROI and comparing it to the image patch at each possible location. The result of the comparison is an indicator metric for each possible location that quantitatively measures how similar the template is to the respective image patch. For each template, the indicator metrics may be organized as a two-dimensional matrix (referred to herein as a "similarity map") having a number rows and columns. It should be noted that by limiting the searching to be within the ROI (as opposed to the entire subsequent frame), computational efficiency may be increased (in terms of processor and memory resources). To achieve this, the ROI may be selected to not be so large as to necessitate substantial computation effort to search within, while also not so small that it does not cover potential changes of location of the template.

At step 248, the template matching machine vision module 144 applies a subpixel method to improve resolution. Typically, with template matching algorithms accuracy of results can be at most one pixel. While this may be adequate in some use cases (e.g., when the video is of high resolution, and the camera is close to the structure), it may not always be sufficient. To address this issue, a subpixel method, such as bicubic interpolation, may be used. According to such a method, a convolution kernel may be applied in both x and y directions. The number of segments to divide each pixel into can be specified, with the more segments the more accurate the result, but more processing and memory resource consumption.

At step 249, the template matching machine vision module 144 determines a best-matching image patch for each template based on the respective similarity map, and calculates responses based on location of the template in the initial frame and the location of the best-matching image patch. The best-matching image patch may be the one with the best indicator metric (e.g. highest or lowest depending on the standard). Displacement may be calculated as the difference in the location of the template in the initial frame and the location of the best-matching image patch. Other responses (e.g., strain, acceleration, velocity, etc.) may be calculated based on the displacement. For example, strain may be calculated as a ratio of deformation over distance between the pair of points. Similarly, velocity may be calculated as change in displacement over a unit of time, and acceleration may be calculated as change in velocity over a change in time.

The operations of steps 244-249 may be implemented in a variety of different manners. In one implementation, the operations may be based on the following example formulas.

The top left corner of the template in the initial frame may be represented as $(x_0, y_0)$. The top left corner of the best-matching image patch in the ith subsequent frame may be represented as $(x_i, y_1)$. Horizonal and vertical displacements between the template in the initial frame and the best-matching image patch in the ith subsequent frame may be give as:

$$D_{x=x_i-x_0}^i$$

$$D_{y=y_i-y_0}^i$$

To determine these displacements, the subsequent frame may be represented as a matrix of $I(x, y)$, where $(x, y)$ is pixel position and $I(x, y)$ is the pixel intensity at a location. The indicator metric at a specific location $(x, y)$ within the ROI is denoted as $R(x, y)$, which forms the basis for the similarity map $T(x, y)$.

The indicator metric $R(x, y)$ may be calculated differently depending on the type of template-matching algorithm selected. Correlation-like template matching algorithms, such as SQDIFF, CCORR and CCOEFF algorithms may calculate $R(x, y)$ in somewhat similar manners.

For example, if a SQDIFF algorithm is selected, the indicator metric $R(x, y)$ may be given as:

$$R(x, y) = \Sigma_{x',y'}(T(x', y') - I(x+x', y+y'))^2.$$

Further, if SQDIFF is normalized, the indicator metric $R(x, y)$ may be given as:

$$R(x, y) = \frac{\sum_{x',y'}(T(x', y') - I(x+x', y+y'))^2}{\sqrt{\sum_{x',y'}T(x', y')^2 \sum_{x',y'}I(x+x', y+y')^2}}.$$

In such algorithms, a best match may be indicated by the lowest value of $R(x, y)$.

Further, if a CCORR algorithm is selected, the indicator metric $R(x, y)$ may be given as:

$$R(x,y) = \Sigma_{x',y'}(T(x', y')I(x+x', y+y')).$$

Further, if CCORR is normalized, the indicator metric R(x, y) may be given as:

$$R(x, y) = \frac{\left(\sum_{x',y'} T(x', y') - I(x+x', y+y')\right)^2}{\sqrt{\sum_{x',y'} T(x', y')^2 \sum_{x',y'} I(x+x', y+y')^2}}.$$

In such algorithms, a best match may be indicated by the greatest value of R(x, y).

Further, if a CCOEFF algorithm is selected, the indicator metric R(x, y) may be given as:

$$R(x, y) = \sum_{x',y'} T'^{(x', y')} - I'^{(x+x', y+y')} \text{ where}$$

$$T'(x', y') = T(x, y) - \frac{1}{wh} \sum_{x'',y''} T(x'', y''), \text{ and}$$

$$I'(x', y') = I(x, y) - \frac{1}{wh} \sum_{x'',y''} I(x'', y''),$$

where w and h are the width and height of the template respectively. Further, if CCOEFF is normalized, the indicator metric R(x, y) may be given as:

$$R(x, y) = \frac{\sum_{x',y'} T'(x', y') - I'(x+x', y+y')}{\sqrt{\sum_{x',y'} T(x', y')^2 \sum_{x',y'} I(x+x', y+y')^2}}.$$

In such algorithms, a best match may be indicated by the greatest value of R(x, y).

Feature-based template matching algorithms, such as RHOG and PQ-HOG algorithms may calculate R(x, y) in different manners. RHOG and PQ-HOG algorithms may use, for example, L1 norm distance and H-r(t) similarity, respectively, in RHOG and PQ-HOG code similarity measurement.

In a RHOG algorithm, the first step may be to compute gradient. When intensity of a pixel position (x, y) is represented as I(x, y) in a frame, its horizontal derivate and vertical derivative may be given as:

$$f_x(x, y) = \frac{\partial I}{\partial x} 0.5 * (I(x+1, y) - I(x-1, y))$$

$$f_y(x, y) = \frac{\partial I}{\partial y} 0.5 * (I(x, y+1) - I(x, y-1)).$$

Then the gradient orientation angle θ and gradient magnitude $G_m$ can be calculated as:

$$\theta(x, y) = \arctan\left(\frac{f_y}{f_x}\right)$$

$$G_m(x, y) = \sqrt{f_x^2 + f_y^2}.$$

A positive integer, $N_{bins}$, may be selected as a number of orientation bins. Assuming, for example, $N_{bins}=4$. Then the orientation bin $G_b$ may be given as:

$$G_b(x, y) = 4 * \frac{\theta(x, y)}{\pi} + 3; G_b = 1, 2, 3, 4.$$

Another positive integer, $N_g$, may represent a number of neighborhood pixels. For example, if $N_g=1$ it means that the gradient of nine $((2*N_{g+1})^2)$ neighborhoods are taken into account for calculating a RHOG code.

The RHOG code in each orientation bin may be calculated as the summation of gradient magnitudes of the neighborhood pixels that are quantizing into the bin, such that it can be given as:

$$RHOG(x,y,k) = \Sigma_{G_b(x',y')=k} G_m(x', y'),$$

where k=1, 2, . . . , $N_{bins}$; $x-N_g \leq x' \leq x+N_g$; and $y-N_g \leq y' \leq y+N_g$.

A customized function may be used to estimate the similarity between the template and the image patch base on RHOG codes. For example, a RHOG code may be treated as the intensity in each pixel location and a normalized CCO-EFF algorithm may be applied as discussed above.

Alternatively, a sum of L1 norm distance may be computed over all orientation bins. The RHOG code of the template and image patch at a location (x, y) at the kth orientation bin may be denoted as $T_{RHOG}(x, y, k)$ and $I_{RHOG}(x, y, k)$, respectively. The indicator metric R(x, y) for the similarity map may then be given as:

$$R(x,y) = \Sigma_k \Sigma_{x',y'} |T_{RHOG}(x', y', k) - I_{RHOG}(x+x', y+y', k)|.$$

The smaller the L1 norm distance, the greater the similarity between the template and the image patch. Therefore, the location of the best-matching image patch may be found by minimizing L1 norm distance.

Looking to a PQ-HOG implementation, in a PQ-HOG algorithm the first step is to compute a HOG vector. It may use, for example, rectangular HOG (RHOG, as discussed above) or column HOG (CHOG) in which case it may $N_{bins}$-dimensional vector. Then, the HOG vector may be projected and quantized. In essence, this is a random projection that projects high dimensional data into a low dimension while preserving pairwise distance. In one implementation, a very sparse projection approach may be used to project the HOG vector. A projection matrix with the dimension of $N_{bits} \times N_{bins}$ may be filled with entries of {−1, 0, 1} when probabilities $$\left\{\frac{0.5}{\beta}, 1 - \frac{1}{\beta}, \frac{0.5}{\beta}\right\}$$

for a constant β. The constant β may be chosen, for example, as $$\beta = \frac{N_{bins}}{2},$$

which is the most projection instances corresponding to the difference between two vector components and $$N_{bits} = \frac{N_{bins}(N_{bins} - 1)}{2}.$$

After multiplying the HOG vector with the projection matrix, the projected HOG(x, y) is a $N_{bits}$-dimensional vector. Afterwards, each entry in this projected vector may be quantized to a one-bit digit since one-bit quantization approximates the angel between the original vectors. As such, $s_i(x, y)$ may denote the $i^{th}$ ($1 \le i \le N_{bits}$) entry in the projected and quantized vector; $r_i$ may denote the $i^{th}$ row of the projection matrix given as:

$$s_i(x, y) = \begin{cases} 1, & r_i^T HOG(x, y) > 0 \\ 0, & \text{otherwise} \end{cases};$$

and
s(x, y) may be a $N_{bits}$-dimensional binary code a portion of which (e.g., 8 or 24 bits) may be selected as a PQ-HOG code. $N_{PQ\_}$Bits bits may be selected and the resultant binary vector may be PQ_HOG(x, y). Since PQ_HOG(x, y) is binary, Hamming distance (also referred to as "H-distance") may be used to measure the similarity between PQ-HOG codes. Considering a template and a candidate image patch cropped from the top corner (x, y) of a frame, the Hamming distance between a template pixel at (x', y') and image pixel (x+x', y+y') is given as:

$$d(x, y, x', y') = \text{Bitcount}(T_{PQ_{HOG}}(x', y', k) \otimes I_{PQ_{HOG}}(x+x', y+y', k)).$$

This distance d(x, y, x', y') may be modified to replace the pixel error measure with a robust error measure p(d(x, y, x',y'), t), where t is a parameter controlling the shape of p. Bounded M-estimators may be chosen as robust functions. For example, a nondecreasing bounded function may be given as:

$$p(d, t) = \begin{cases} g(d), & \text{if } d < t \\ g(t), & \text{otherwise} \end{cases}.$$

An estimator may be calculated as, for example, a simple truncation with g(d)=d, a trimmed mean M-estimator with g(d)=$d^2$ or a Tukey's estimate with:

$$D_t(x, y, x', y') = \begin{cases} g(t) - f(g(d(x, y, x', y'))), & \text{if } d(x, y, x', y') < t \\ 0, & \text{otherwise} \end{cases}.$$

The indicator metric for the similarity map may be generated through additive match measure, given as:

$$R_t(x, y) = \Sigma_{x',y'} D_t(x, y, x', y').$$

The greatest $R_t(x, y)$ indicates the location of the best-matching image patch. Such a technique may be fast and robust (thereby conserving processor and memory resources) since only similar pixels are compared with the template, which can be interpreted as voting at pixel level. If a pixel error level is smaller than a threshold, then it contributes a particular pixel error to the matching measure. Otherwise, it may be discarded or replaced by another function that is independent of the pixel error.

Returning to FIG. 2, the responses for monitoring points returned by the phase-based machine vision module 142 and/or the template matching machine vision module 144 may be influenced by camera vibration (e.g., caused by wind, traffic, etc.). Camera vibration may induce additional motion in the video which may reduce accuracy of the returned output responses. At step 250, the camera vibration cancellation module 146 attempts to cancel the effects of camera vibration by subtracting their responses from each monitoring point response. While this may be performed in various ways, in one implementation, camera vibration cancellation is based upon motion of a selected reference point.

Figure 4:
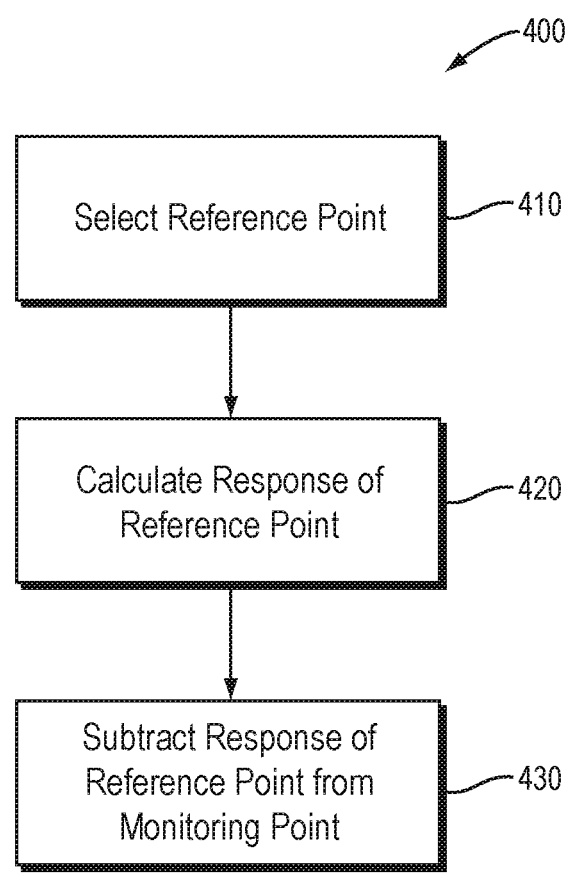
FIG. 4 is a flow diagram of an example sequence of steps for camera vibration cancellation based upon motion of a selected reference point.

FIG. 4 is a flow diagram of an example sequence of steps 400 for camera vibration cancellation based upon motion of a selected reference point. At step 410, the camera vibration cancellation module 146 selects a reference point in in each frame of the video. The reference point may be selected on a stationary object separate from the structure. At step 420, the camera vibration cancellation module 146 calculates responsE of the reference point. Response of the reference point are treated as responses due to vibration of the video camera. At step 430, the camera vibration cancellation module 146 subtracts the response of the reference point from the response for each monitoring point to produce a camera vibration cancelled response.

The operations of steps 420 and 430 may be implemented in a variety of different manners. In one implementation where the response being determined is velocity, the operations may be based on the following example formulas.

If r is the reference point and $u_{rx}$ is the velocity in the x direction for the reference point r, the decomposed velocity in the x direction for the monitoring point p is:

$$U_{px}^d = u_{px} - u_{rx}.$$

Similarly, the decomposed velocity in they direction for the monitoring point p is:

$$U_{py}^d = u_{py} - u_{ry}.$$

The response for each monitoring point returned by the phase-based machine vision module 142 and/or the template matching machine vision module 144 may be also influenced by video noise. Video noise will reduce accuracy of the returned responses.

At step 260, the denoising module 147 attempts to denoise each monitoring point response to address the effects of video noise. Video denoising may be performed using any of a variety of spatial domain or transform domain denoising algorithms. In one implementation where the response being determined is velocity, the operations may be based on the following example formulas.

For a monitoring point p, the velocity in each direction may be calculated as the average of $n_x$ and/or $n_y$ pixels in the neighborhood of pixel p, given as:

$$\overline{u_p^d(x, y)} = \frac{\left[\sum_{i=1}^{n_x} u_p^d(x, y) + \sum_{j=1}^{n_{xy}} u_p^d(x, y)\right]}{(n_x + n_y)},$$

where $u_p^d(x, y)$ is the extracted velocities in x and y directions, and $n_x$ and $n_y$ are a number of pixels for processing video.

At step 270, the structural health monitoring software application 140 saves the responses. Up until steps 270, the vibration cancelled and denoised responses may be in the unit of pixels. As part of the saving operation, the structural health monitoring software application 140 may convert the responses to a standard unit using a scaling factor, which may be obtained based on a ratio of distance in the real-world to the number of pixels between two points in the video.

At step 280, these may be further processed to produce an indicator. Depending on the implementation, the further processing and indicator may take any of a variety of different forms. In one implementation, the further processing may simply involve organizing the responses and the indicator for graphical display. For example, in an implementation where the responses are displacements they may be organized over time to produce a graph of displacement verses time. In other implementations, the further processing may involve determining other quantities based on the responses and the indicator may be these other quantities or a graphical display related to these other quantities. For example, the further processing may involve applying a defects/damage detection algorithm and the indicator may be a graphical display of detected defects and/or damage.

Figure 5:
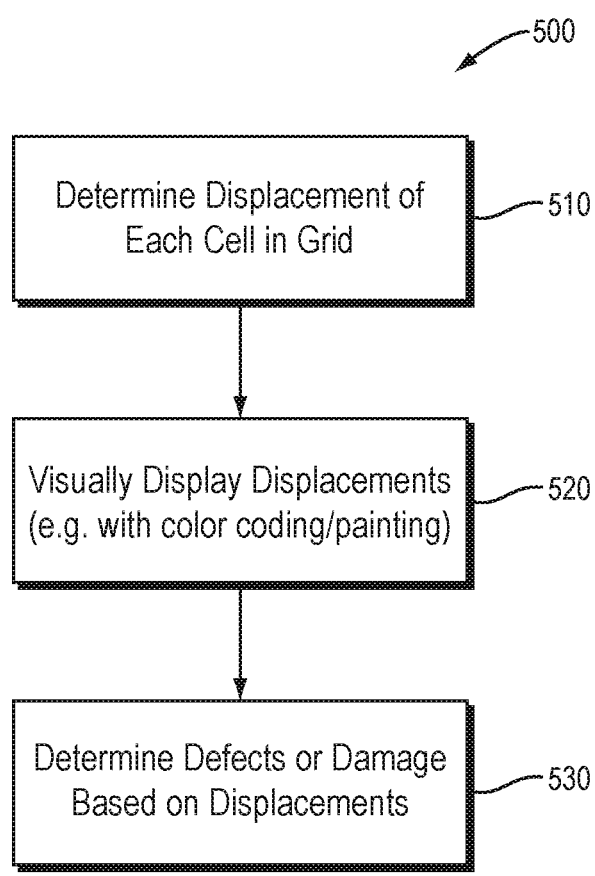
FIG. 5 is a flow diagram of an example sequence of steps that may be employed to detect defects and/or damage.

FIG. 5 is a flow diagram of an example sequence of steps 500 that may be employed to detect defects and/or damage. Before the steps are executed the structural health monitoring software application 140 may have already selecting an area of interest having a limited size in the video (e.g., in response to user input processed by the user interface module 149) and divided the area of interest into a grid of cells. If a template matching algorithm is being used, each cell may be treated as a template such that template matching is performed on the resulting grid of templates.

At step 510, the defect/damage detection algorithm 148 determines a displacement of each cell. For a structure without defects or damage all the cells within an area of interest of limited size are expected to move in substantially the same direction if at all under an external load at a given time. However, if there is a defect or damage (e.g., a crack) on or under the surface of the structure, the cells on each side of the defect or damage often will move in markedly different direction.

Figure 6A:
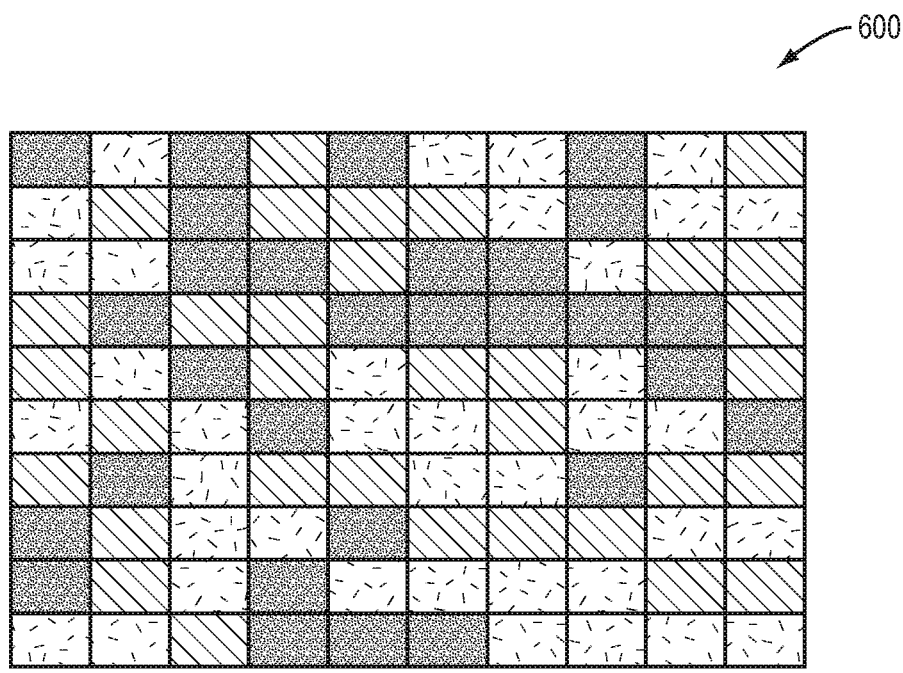
FIG. 6A is an example image of a grid of cells showing a substantially uniform color distribution consistent with no defects or damage.
Figure 6B:
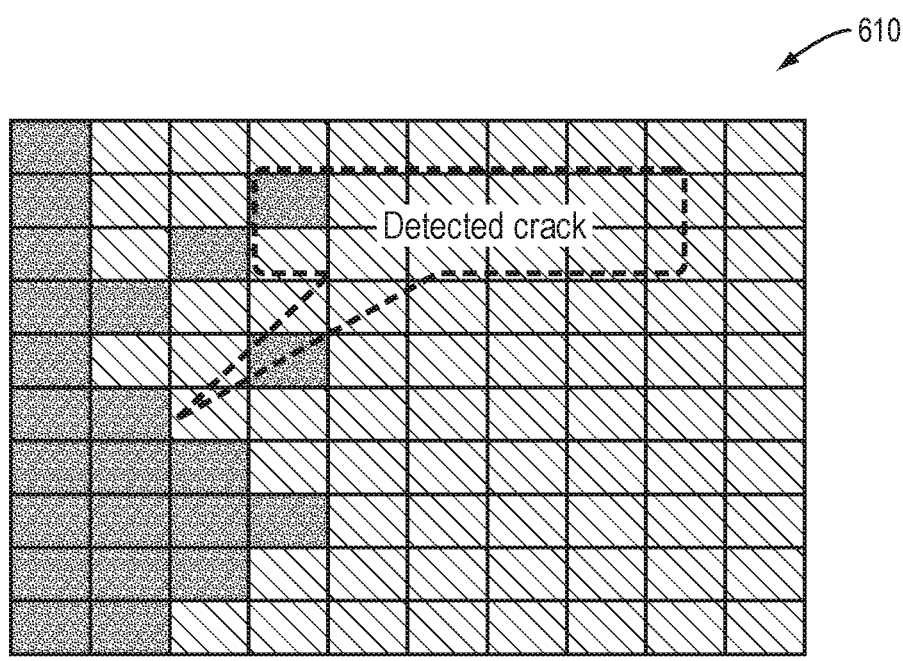
FIG. 6B is an example image of a grid of cells showing a color boundary consistent with a crack.

At step 520, the displacements are visually displayed by the user interface module 149, for example, by color-coding/painting each cell with a color that that indicates a direction of the displacement. For a structure without defects or damage the cells within an area of interest of limited size are expected to have a substantially uniform color distribution. However, if there is a defect or damage (e.g., a crack) on or under the surface of the structure, the cells on each side of the defect are expected to have substantially different color distributions, such that a color boundary is presented. FIG. 6A is an example image 600 of a grid of cells showing a substantially uniform color distribution consistent with no defects or damage. FIG. 6B is an example image 610 of a grid of cells showing a color boundary consistent with a crack.

At step 530, the defect/damage detection algorithm 148 determines detects defects or damage based on differences in the displacement of cells. Such operation may be performed automatically, for example in response to a comparison calculation of the determined displacement of each cell, or manually, for example, in response to a user observing the color-coding/painting of each cell in a display, and visually determining the location of defects based on differing color distributions.

Figure 7A:
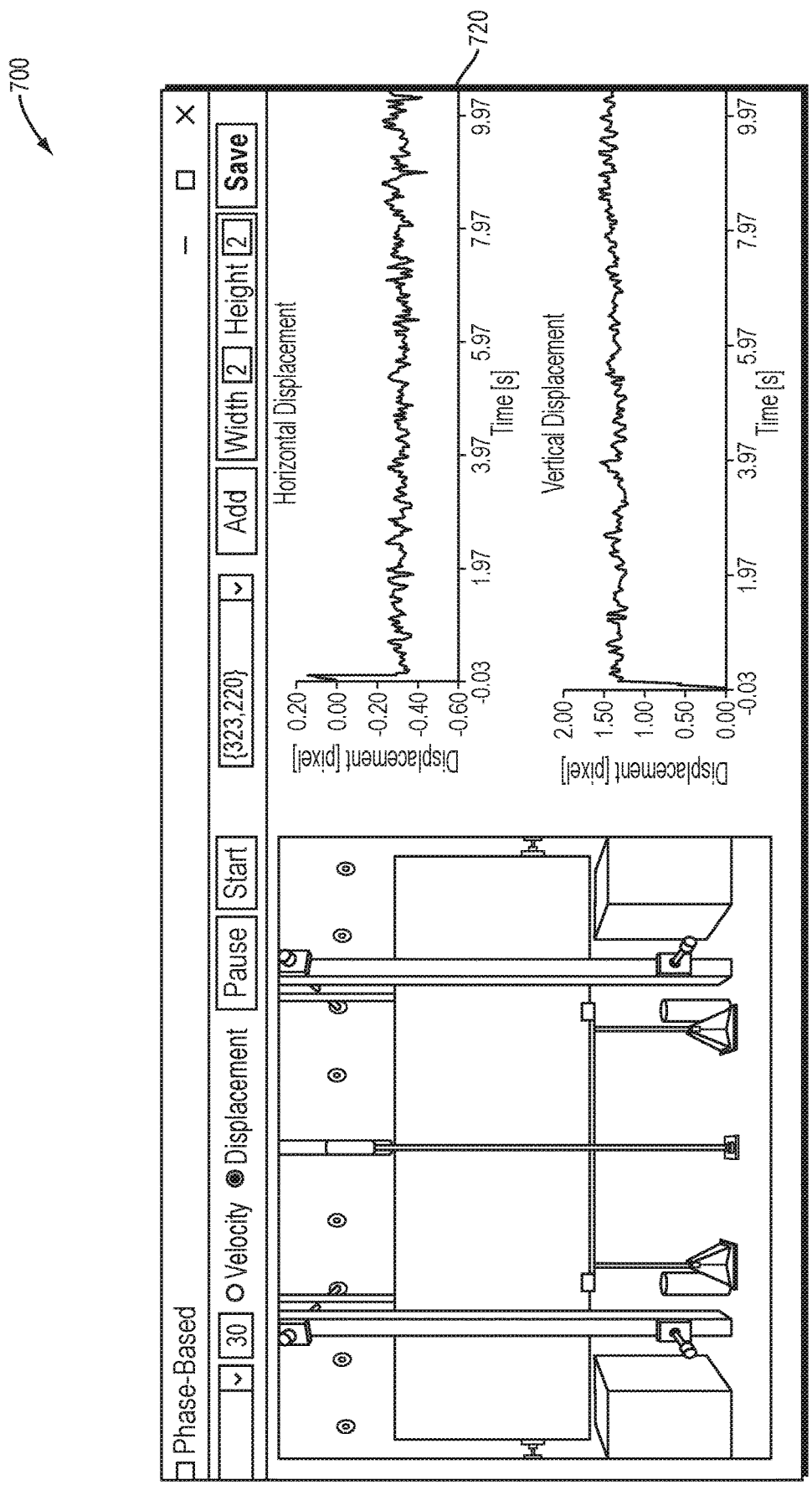
FIGS. 7A is a screen shot of an example user interfaces that may be presented to display an indicator based on responses.
Figure 7B:
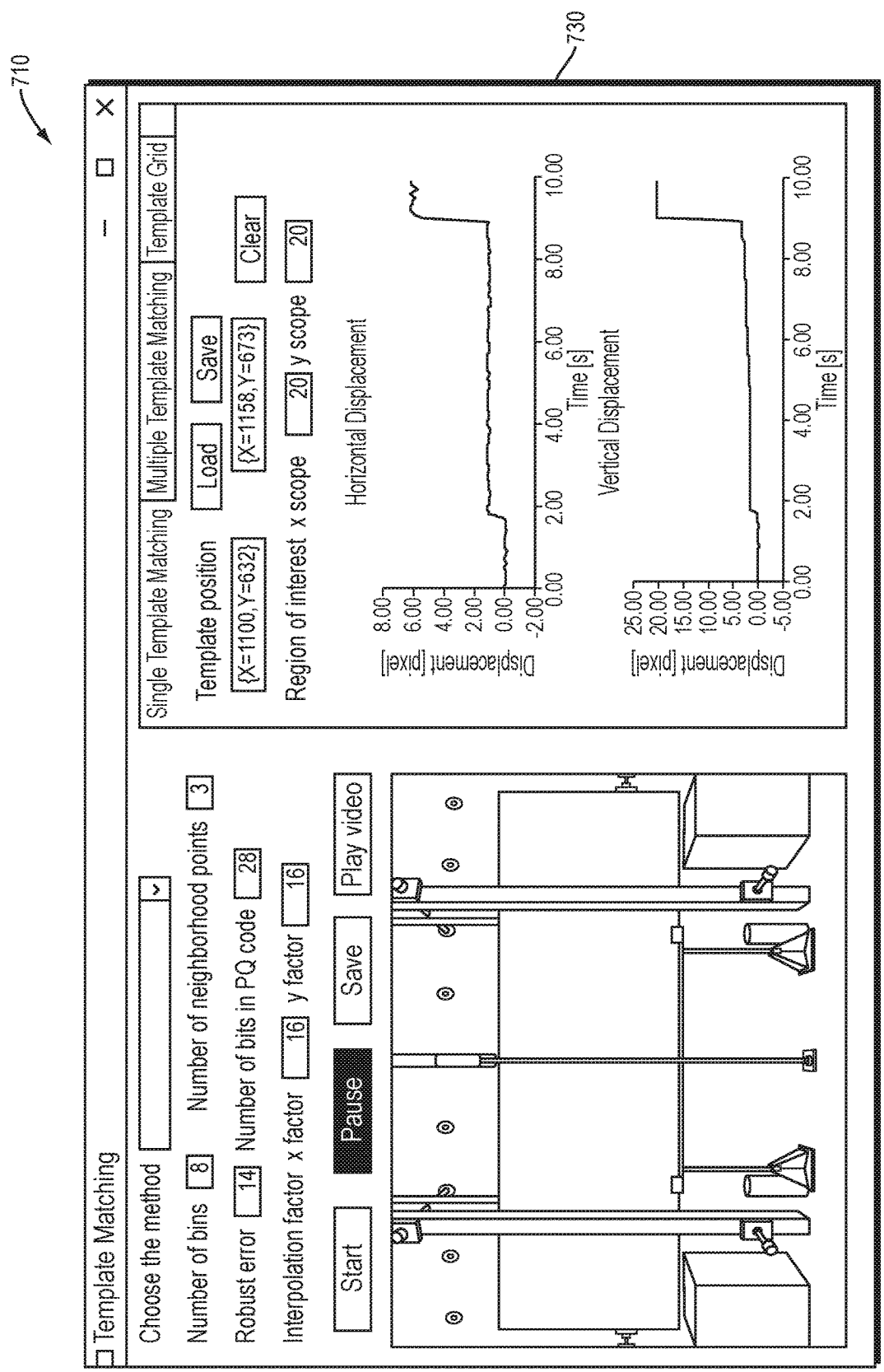
FIGS. 7B is a screen shot of another example user interfaces that may be presented to display an indicator based on responses.

Returning to FIG. 2, at step 290, the user interface module 149 displays may display an indicator based on responses or detected defects/damage. For example, text, tables, graphs, images and the like may be displayed on a display screen. FIGS. 7A-7B are screen shot 700-710 of example user interfaces that may be presented by the user interface module 149 to display an indicator based on responses. In these examples, graphs 720 of displacement are based on phase-based algorithms and graph 730 of displacement is based on template matching algorithms.

It should be understood that various adaptations and modifications may be readily made to what is described above, to suit various implementations and environments. While it is discussed above that many aspects of the techniques may be implemented by specific software modules executing on hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for non-contact structural health monitoring, comprising:
   obtaining, by a structural health monitoring software application executing on one or more computing devices, a video of a structure captured by a video camera;
   selecting a phase-based algorithm and a template matching algorithm from a set of multiple machine vision algorithms provided by the structural health monitoring application;
   applying the phase-based algorithm to produce first dynamic structural responses and the template matching algorithm to produce second dynamic structural responses and combining the first dynamic structural responses and the second dynamic structural responses;
   denoising the combined first dynamic structural responses and second dynamic structural responses by applying one or more spatial domain or transform domain denoising algorithms to at least some dynamic structural responses; and
   displaying, by the structural health monitoring software application, an indicator based on the combined first dynamic structural responses and second dynamic structural responses in a user interface on a screen of the one or more computing devices.

2. The method of claim 1, wherein the applying the template matching algorithm further comprises:
   selecting parameters for the template-matching algorithm;
   defining one or more templates in an initial frame of the video based on the parameters;
   searching for each template in subsequent frames of the video by sliding each template, comparing each template to the image patch at each possible location, and generating a similarity map based on the comparing; and
   determining a best-matching image patch for each template using the respective similarity map and calculating dynamic structural responses based on location of the template in the initial frame and the location of the best-matching image patch.

3. The method of claim 2, wherein the applying the template matching algorithm further comprises:
   selecting a region of interest (ROI) for each template, and wherein the searching is confined to be within the ROI of the respective template.

4. The method of claim 2, wherein the applying the template matching algorithm further comprises:
   applying a subpixel method to improve resolution.

5. The method of claim 1, wherein the applying the phase-based algorithm further comprises:
calculating local phases of the interested points of each frame of the video; and
tracking phase change for the interested points within respective neighborhoods.

6. The method of claim 1, wherein the second dynamic structural responses are displacements, the indicator is an indicator of defects or damage to the structure, and the method further comprises:
selecting an area of interest in the video;
dividing the area of interest into a grid of cells that are each treated as a template by the template matching algorithm;
determining a displacement of each cell; and
detecting defects or damage based on differences in the displacement of cells.

7. The method of claim 1, wherein the second dynamic structural responses are displacements, the indicator is an indicator of strain on the structure, and the method further comprises:
selecting an area of interest in the video;
selecting from the area of interest a first template and a second template to be used by the template matching algorithm;
determining a displacement of a pair of points associated with the first template and the second template, respectively; and
determining strain as a ratio of deformation over distance between the pair of points.

8. The method of claim 1, wherein the first dynamic structural responses or the dynamic structural second responses are velocities or accelerations.

9. A computing device, comprising:
a processor; and
a memory coupled to the processor and configured to store instructions of a structural health monitoring software application that when executed on the processor are operable to:
obtain a video of a structure captured by a video camera,
select both a phase-based algorithm and a template matching algorithm from a set of multiple machine vision algorithms provided by the structural health monitoring application,
apply the phase-based algorithm to the video of the structure to produce first dynamic structural responses and the template matching algorithm to the video of the structure to produce second dynamic structural responses, wherein
the phase-based algorithm when applied calculates local phases of interested points of each frame of the video, and tracks phase change for the interested points within respective neighborhoods, and
the template matching algorithm when applied defines one or more templates in an initial frame of the video, searches for each template in subsequent frames of the video by sliding each template, compares each template to the image patch at each possible location, generates a similarity map based on the comparison, and determines a best-matching image patch for each template using the respective similarity map,
combine the first dynamic structural responses and the second dynamic structural responses;
denoise the combined first dynamic structural responses and second dynamic structural responses by applying one or more spatial domain or transform domain denoising algorithms to at least some dynamic structural responses; and
display an indicator based on the combined first dynamic structural responses and the second dynamic structural responses in a user interface.

10. The computing device of claim 9, wherein the instructions of the structural health monitoring software application when executed are further operable to:
select a region of interest (ROI) for each template,
wherein search is confined to be within the ROI of the respective template.

11. The computing device of claim 9, wherein the instructions of the structural health monitoring software application when executed are further operable to:
apply a subpixel method to improve resolution, wherein the subpixel method comprises bicubic interpolation.

12. The computing device of claim 9, wherein the second dynamic structural responses include displacements, the indicator is an indicator of defects or damage to the structure, and the instructions of the structural health monitoring software application when executed are further operable to:
select an area of interest in the video,
divide the area of interest into a grid of cells that are each treated as a template by the template matching algorithm,
determine a displacement of each cell, and
detect defects or damage based on differences in the displacement of cells.

13. The method of claim 9, wherein the second dynamic structural responses include displacements, the indicator is an indicator of strain on the structure, and the instructions of the structural health monitoring software application when executed are further operable to:
select an area of interest in the video,
select from the area of interest a first template and a second template to be used by the template matching algorithm,
determine a displacement of a pair of points associated with the first template and the second template, respectively, and
determine strain as a ratio of deformation over distance between the pair of points.

14. A non-transitory computer readable media storing instructions for execution on one or more processors of one or more computing devices, the instructions when executed configured to:
obtain a video of a structure captured by a video camera,
apply a phase-based algorithm to the video of the structure to produce first dynamic structural responses and a template matching algorithm to the video of the structure to produce second dynamic structural responses, wherein
the phase-based algorithm when applied calculates local phases of interested points of each frame of the video, and tracks phase change for the interested points within respective neighborhoods, and
the template matching algorithm when applied defines one or more templates in an initial frame of the video, searches for each template in subsequent frames of the video by sliding the template, compares each template to the image patch at each possible location, generates a similarity map based on the comparison, and determines a best-matching image patch for each template using the respective similarity map, combine the first dynamic structural responses and the second dynamic structural responses;

denoise the combined first dynamic structural responses and second dynamic structural responses by applying one or more spatial domain or transform domain denoising algorithms to at least some dynamic structural responses; and display an indicator based on the combined first dynamic structural responses and second dynamic structural responses in a user interface.

15. The non-transitory computer readable media of claim 14, wherein the instructions when executed are further configured to:

select a region of interest (ROI) for each template, wherein search is confined to be within the ROI of the respective template.

16. The non-transitory computer readable media of claim 14, wherein the instructions when executed are further configured to:

apply a subpixel method to improve resolution, wherein the subpixel method comprises bicubic interpolation.

\* \* \* \* \*